(12) United States Patent
Hepsaydir

(10) Patent No.: US 7,327,980 B2
(45) Date of Patent: Feb. 5, 2008

(54) RADIO SIGNAL REPEATER

(75) Inventor: Erol Hepsaydir, Berkshire (GB)

(73) Assignee: Hutchison Whampoa Three Gip (Bahamas) Limited, New Providence (BS)

( * ) Notice: Subject to any disclaimer, the term of this patent is extended or adjusted under 35 U.S.C. 154(b) by 564 days.

(21) Appl. No.: 10/353,846

(22) Filed: Jan. 29, 2003

(65) Prior Publication Data

US 2003/0166393 A1 Sep. 4, 2003

(30) Foreign Application Priority Data

Jan. 29, 2002 (GB) ................................ 0201987.5

(51) Int. Cl.
*H04B 7/15* (2006.01)
*H04B 7/14* (2006.01)
*H04B 3/36* (2006.01)

(52) U.S. Cl. .................... 455/11.1; 455/16; 455/7; 375/211

(58) Field of Classification Search ............... 455/11.1, 455/7, 10, 17, 9, 16; 375/135, 137
See application file for complete search history.

(56) References Cited

U.S. PATENT DOCUMENTS

| | | | | |
|---|---|---|---|---|
| 4,806,938 A | * | 2/1989 | Meadows | 342/370 |
| 5,963,847 A | * | 10/1999 | Ito et al. | 455/17 |
| 6,731,904 B1 | * | 5/2004 | Judd | 455/11.1 |
| 6,993,287 B2 | * | 1/2006 | O'Neill | 455/11.1 |
| 7,123,911 B1 | * | 10/2006 | Ngan | 455/435.2 |
| 2002/0123306 A1 | * | 9/2002 | Masoian | 455/7 |
| 2003/0045230 A1 | * | 3/2003 | Weissman | 455/11.1 |
| 2003/0123401 A1 | * | 7/2003 | Dean | 370/318 |

FOREIGN PATENT DOCUMENTS

| | | |
|---|---|---|
| EP | 0777400 | 6/1997 |
| WO | WO0048272 | 8/2000 |
| WO | WO0110163 | 2/2001 |
| WO | WO0178254 | 10/2001 |

OTHER PUBLICATIONS www.hitachi-cable.co.jp/en/review/18/review06.pdf, Hitachi Cable Review, No. 18, Oct. 1999, "Antennas for the Next Generation Wideband CDMA Handyphone System", Kuga et al.
www.privateline.com/celpcslevine.pdf, Digital Switching, Apr. 2000, R. Levine, see pp. 9-12.

* cited by examiner

*Primary Examiner*—Tilahun Gesesse
(74) *Attorney, Agent, or Firm*—Dann, Dorfman, Herrell and Skillman, P.C.

(57) ABSTRACT

A UMTS 3g repeater and a Multi Sector Directional LMU Antenna Array can be integrated to be deployed inside large structures and large moving vehicles such as ferries and trains.

10 Claims, 1 Drawing Sheet

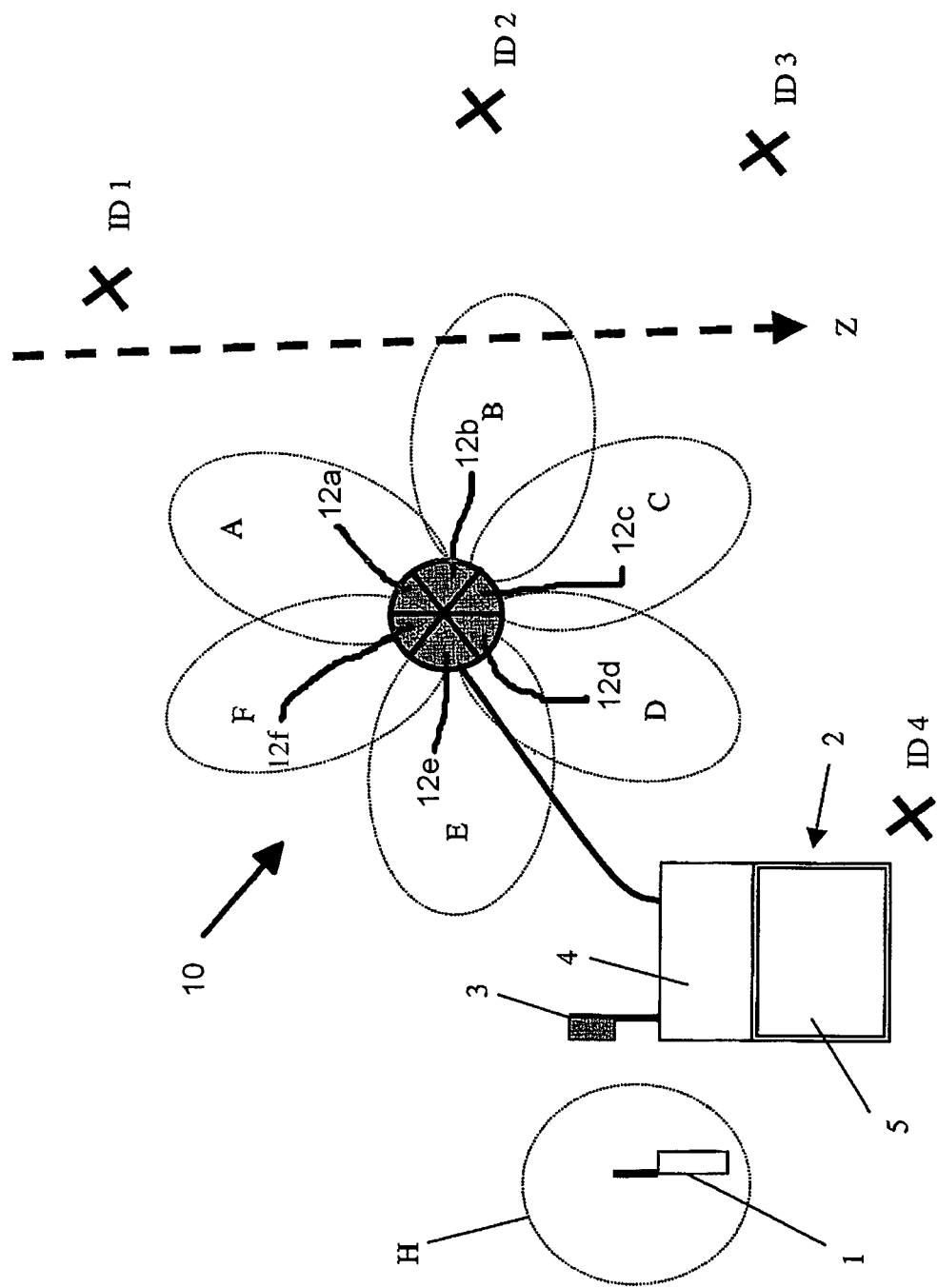

RADIO SIGNAL REPEATER

FIELD OF THE INVENTION

The present invention relates to repeaters for radio communications, and in particular communications with mobile devices located inside transmission coverage holes such as buildings, and large vehicles such as ferries and trains.

BACKGROUND OF THE INVENTION

In certain large buildings and vehicles, repeaters are used to receive the signal outside, boost the signal and retransmit inside. Currently, fixed sectored (60 or 90 degrees coverage) or omni directional antennas (360 degrees coverage) are used to receive the signal outside. The disadvantage of these antennas is that they receive all the signals from many sites. This increases the noise level in the WCDMA network which corresponds to a decrease in the network capacity. There are now available multi-sector directional LMU (location monitoring unit) arrays. They are installed at many locations in a city and are used to provide angle information to locate mobile devices—i.e. terminals. A terminal can then be offered location-based services such as directions to the nearest bank or restaurant. Multi Sector Directional LMU Antenna Arrays are small size multi sector units. Each sector consists of a DRA (Dielectric Resonant Antenna) antenna. Each antenna is connected to a receiver and the receiver outputs may be compared.

SUMMARY OF THE INVENTION

The present invention provides a repeater for boosting radio signals having an associated multi-sector directional antenna array comprising a plurality of individual directional antennas, the array having means for comparing signals received by the individual antennas and means for controlling the antennas whereby only a selection of the antennas receiving the best quality signals is operational at any time and the signals from the selected antenna(s) is/are boosted by the repeater. As a result of only certain of the antennas being selected for operation, only signals from certain of the transmitters communicating with the array will be boosted for onward transmission. The invention has been proposed for use in UMTS communications but is more generally applicable.

The invention also provides a communications system using one or more repeaters as described above.

DETAILED DESCRIPTION

In a preferred system according to the invention, several multi sector directional antenna arrays, one for each large vehicle/building etc, are used to select the most suitable UMTS 3g site, at which a transmitter is located, by comparing each receiver output connected to each Multi Sector Directional LMU Antenna Array sector. This technique especially improves the performance on moving vehicles such as ferries and trains where the signal is varying constantly.

Preferably, the antenna array is a LMU array as described above and is associated with a UMTS 3g repeater. The advantage of a LMU array is that it dynamically selects the most suitable site, or transmitter.

The Multi Sector Directional LMU Antenna Arrays are small and can easily be fitted in small places.

There are two major applications for this invention. Firstly it can be used on a moving large vehicle e.g. a ferry travelling on a harbour such as Hong Kong, London or Sydney. Use of Multi Sector Directional LMU Antenna Arrays with the repeaters reduces the noise level in the network by selecting only one site with the best signal conditions dynamically. They are easy to mount on the ferries and fast moving trains. Secondly, they can be deployed on fixed structures such as shopping centres. The major advantage is to select the most suitable site in the network to retransmit inside the building.

As an example, a Multi Sector Directional LMU Antenna Array pattern and site locations are shown in the accompanying drawing.

The drawing shows a number of base station transmitter sites ID1-ID4 having stationary transmitters transmitting signals to a LMU array 10. The LMU array 10 comprises directional antennas 12a, 12b, 12c, 12d, 12e, and 12f having respective sector coverage areas A-F. The LMU array 10 is dedicated to a transmitter coverage "hole" H, in this example a large vehicle. Other examples of coverage holes include large buildings such as shopping centres, trains and other locations at which signals from the transmitter sites are weak. The array has an associated repeater which boosts received signals from the base station transmitters before retransmitting to mobile terminals within the vehicle, one of which is indicated by reference numeral 1.

The repeater is preferably provided as an integral unit 2, comprising an antenna array 3, a controller 4 and the repeater 5. The controller has means for comparing the signals received by the individual antennas from multiple antennas at ID1-ID4. Depending on the relative strengths of the received signals, the controller will select the antenna or antennas receiving the best quality signals to be boosted by the repeater for onward transmission to a terminal 1.

The antenna array 10 will in effect select the most appropriate site or sites according to their relative signal strengths as described above. According to the figure, antenna 12a is the best choice for the Site ID 1, antenna 12b is for Site ID 2, antennas 12b and 12c are for Site ID 3 and antenna 12d is for site ID 4. Thus not all of the antennas of the array are used at any one time.

As the vehicle moves from site ID 1 to Site ID 2, in the direction of arrow Z, the system shall use both antenna 12a and antenna 12b. As the vehicle moves further away from the site ID 1, the antenna A will be switched off dynamically so that signals from site ID1 are no longer retransmitted. The hand over from one site to another will be carried out according to existing standards.

The invention claimed is:
1. Apparatus for boosting radio signals in a radio communications system comprising:
   a multi-sector directional array having a plurality of individual directional antennas, each antenna being adapted for receiving radio signals in a respective coverage area within the communications system;
   a controller operatively connected to said multi-sector directional array, said controller being adapted to compare signals received by individual ones of the directional antennas and to select for operation one or more of the antennas receiving a best quality signal; and
   a repeater operatively connected to said controller for boosting signals which are received from the selected antenna(s).
2. A repeater as claimed in claim 1 in which the repeater and associated antenna array are integrated in a single device.

3. A repeater as claimed in claim 1 arranged to boost UMTS signals.

4. A repeater as claimed in claim 1 in which the multi-sector directional array is a location monitoring unit array.

5. A mobile communications system including a plurality of stationary radio transmitters exchanging radio signals with a plurality of mobile terminals in which an area of poor reception from the transmitters is provided with a repeater an apparatus as claimed in claim 1.

6. A system as claimed in claim 5 in which at least one building is provided with an apparatus for boosting radio signals comprising:
   a multi-sector directional array having a plurality of individual directional antennas, each antenna being adapted for receiving radio signals in a respective coverage area within the communications system;
   a controller operatively connected to said multi-sector directional array, said controller being adapted to compare signals received by individual ones of the directional antennas and to select for operation one or more of the antennas receiving a best quality signal; and
   a repeater operatively connected to said controller for boosting signals which are received from the selected antenna (s).

7. A system as claimed in claim 5 in which at least one vehicle is provided with an apparatus for boosting radio signals comprising:
   a multi-sector directional array having a plurality of individual directional antennas, each antenna being adapted for receiving radio signals in a respective coverage area within the communications system;
   a controller operatively connected to said multi-sector directional array, said controller being adapted to compare signals received by individual ones of the directional antennas and to select for operation one or more of the antennas receiving a best quality signal; and
   a repeater operatively connected to said controller for boosting signals which are received from the selected antenna(s).

8. A mobile communications system including a plurality of radio transmitters exchanging radio signals with a plurality of mobile terminals in which a multi sector directional antenna array is used to select an appropriate transmitter or transmitters for communication with one or more mobile terminals in a restricted geographical area, the array having a controller for comparing signals received by the individual antennas from multiple transmitters and selecting a transmitter or transmitters based on the quality of received signals, and said array being connected to a repeater for amplifying signals for transmission to the mobile terminal (s).

9. A mobile communications system as claimed in claim 8 in which the restricted geographical area is a building.

10. A mobile communications system as claimed in claim 8 in which the restricted geographical area is a vehicle.

* * * * *